United States Patent [19]

Badesha

[11] Patent Number: 4,530,718
[45] Date of Patent: Jul. 23, 1985

[54] PROCESS FOR RECLAMATION OF HIGH PURITY SELENIUM FROM SCRAP ALLOYS

[75] Inventor: Santokh S. Badesha, Ontario, N.Y.

[73] Assignee: Xerox Corporation, Stamford, Conn.

[21] Appl. No.: 594,626

[22] Filed: Mar. 29, 1984

[51] Int. Cl.³ .................... C01B 19/02; C22B 3/00
[52] U.S. Cl. ........................................ 75/121; 423/510
[58] Field of Search .................. 423/508, 510; 75/121

[56] References Cited

U.S. PATENT DOCUMENTS

| | | | |
|---|---|---|---|
| 2,409,835 | 10/1946 | Clark et al. | 23/209 |
| 2,413,374 | 12/1946 | Phillips et al. | 23/209 |
| 2,474,966 | 7/1949 | Addink et al. | 252/62.3 |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,097,267 | 6/1978 | Baccaro et al. | 75/0.5 B |
| 4,389,389 | 6/1983 | Badesha | 423/510 |
| 4,411,698 | 10/1983 | Badesha | 75/121 |

Primary Examiner—Earl C. Thomas
Assistant Examiner—Jeffrey E. Russel
Attorney, Agent, or Firm—E. O. Palazzo

[57] ABSTRACT

This invention relates to a process for the reclamation of selenium in high purity from scrap alloys which comprises converting the alloy to a mixture of oxides, separating the selenium oxide formed by alcoholic dissolution, followed by treating this solution with a reducing agent, and thereafter separating the selenium product therefrom.

8 Claims, 1 Drawing Figure

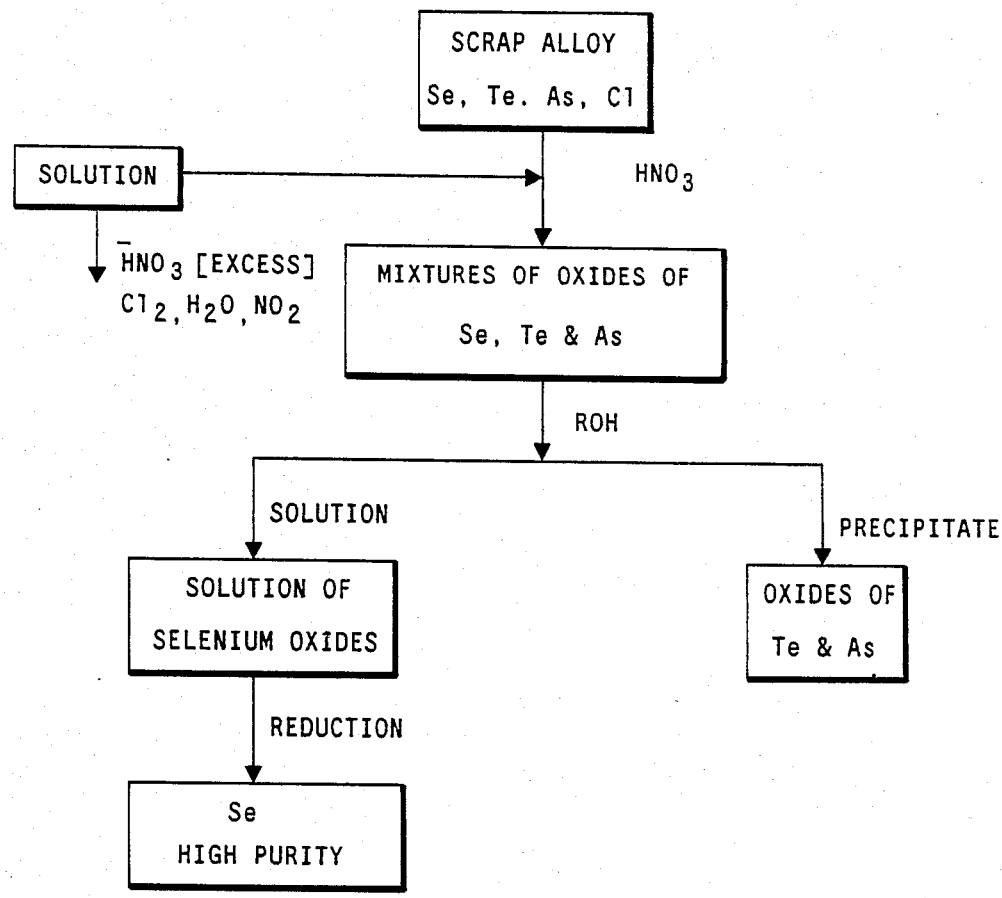

PROCESS FOR RECLAMATION OF HIGH PURITY SELENIUM FROM SCRAP ALLOYS

BACKGROUND

This invention is generally directed to improved processes for reclaiming certain metallic elements, such as selenium, tellurium and arsenic, and more specifically, the present invention is directed to a process for obtaining high purity selenium, from a crude source material, such as a scrap alloy material containing selenium, tellurium, arsenic, and in some instances halogen substances including chlorine. In accordance with the simple direct, economically attractive process of the present invention, there is obtained in one embodiment selenium, in a purity of 99.999 percent, and pollution hazards as present with some prior art processes are eliminated. High purity materials produced in accordance with the process of the present invention are useful as imaging members, particularly as photoconductive members, in electrophotographic imaging systems, especially those where an electrostatic latent image is formed on the imaging member involved.

The art of xerography as presently practiced involves the formation of an electrostatic latent image on a photoconductive imaging member which can be in the form of a plate, a drum, or a flexible belt, for example. Materials commonly selected for the photoconductive member contain amorphous selenium, amorphous selenium alloys, halogen doped amorphous selenium, halogen doped amorphous selenium alloys and the like. These photoconductive substances must be of high purity, that is a purity of 99.999 percent or greater, since the presence of contaminants has a tendency to adversely affect the imaging properties of the photoconductive substances, including the electrical properties thereof, causing copy quality obtained from such devices to be relatively poor in comparison to devices wherein high purity substances are selected. Numerous complex processes are known for obtaining photoconductive substances such as selenium, or alloys of selenium, which processes can be classified as chemical processes and physical processes. Flexible photoreceptor devices containing photoconductive substances, such as selenium, prepared in accordance with these processes have a tendency to deteriorate over a period of time and thus, the selenium or selenium alloy used, for example, must be recovered and recycled, primarily since these materials are costly, and further to avoid environmental pollution. Various methods are available for recovering selenium and its alloys from the substrate on which it is deposited including heat stripping, water quenching, ultrasonics, and bead blasting.

The prior art processes, including the chemical processes for obtaining high purity materials of selenium and selenium alloys, from contaminated source materials containing these substances, involve a number of process steps, and undesirably high temperature distillations. Additionally, in many of these processes, the recycling of reactants is not achieved. In most instances, the prior art processes for recovering selenium, selenium alloys, or other metallic elements from contaminated source materials is complex, economically unattractive, causes environmental contamination in that, for example, vaporous oxides are formed and must be eliminated. Additionally, many of these processes result, for example, in the recovery of selenium, or selenium alloys which nevertheless contain impurities that can over an extended period of time adversely effect the photoconductivity of the selenium.

There is described in U.S. Pat. No. 4,047,973, a method for recovering selenium, or an alloy thereof from the surface of an endless xerographic belt containing a metal substrate having deposited thereon a thin layer of an organic resinous material which is overcoated with a relatively thicker layer of selenium or a selenium alloy, by subjecting the surface of the belt to jets of high water pressure for the purpose of stripping the selenium or selenium alloy without substantially effecting the layer of organic resinous material. According to the disclosure of this patent, subsequent to removal of the water from the slurry, there is obtained substantially pure selenium or an alloy thereof. This is an example of a prior art physical process for recovering selenium or selenium alloys.

Other prior art processes of interest with respect to the process of the present invention to be described in detail hereinafter include U.S. Pat. No. 4,009,249 and 4,007,255.

In the U.S. Pat. No. 4,009,249 patent there is disclosed a process for precipitating stable red amorphous selenium which may contain a halogen, with hydrazine from a solution of selenous acid in methanol or ethanol. The process is accomplished at a temperature of between about $-20°$ C. and the freezing point of the solution selected. The resulting precipitate is maintained at a temperature of about $-13°$ C. to about $-3°$ C. until a red color appears. The patent U.S. Pat. No. 4,007,255 contains a similar disclosure with the exception that there is disclosed a process for producing a stable red amorphous selenium material containing thallium. There is reference in both of these patents to processes for precipitating selenium by reducing selenous acid in an aqueous solution with sulfur dioxide or sulfurous acid as described in British Pat. No. 515,676, and U.S. Pat. Nos. 2,186,085 and 3,130,012. Further it is stated in these patents that a process for precipitating selenium from an aqueous solution of selenous acid with sulfur dioxide, hydroxylamine hydrochloride, or hydrazine sulfate at 6° to 45° C. is described in U.S. Pat. No. 2,860,954.

Moreover there is described in a copending application an improved process for obtaining in high purity photoconductive compositions, including selenium, tellurium, and arsenic which comprises providing a source material, converting the source material into a mixture of corresponding oxides, converting the oxides to pure esters, and subsequently affecting a reduction of the esters. More specifically, there is described in the copending application an improved process for reclaiming or recovering selenium, tellurium, or arsenic, in high purity, 99.999 percent, which comprises providing a source material, such as a scrap alloy containing these elements and other substances, converting this material into a mixture of the corresponding oxides of the elements, reacting the resulting oxides with an alcohol, or a diol, followed by separation of the resulting esters from the reaction mixture, and subjecting, subsequent to purification by distillation, or recrystallization the esters to a coreduction reaction. The invention of the present application is directed to a similar process with the important exception that the formation of the ester is eliminated.

Accordingly, there continues to be a need for improved processes for reclaiming or recovering photoconductive metallic materials, such as selenium, from crude source materials including scrap alloys and virgin compositions containing these elements. Additionally, there continues to exist a need for an improved simple low temperature chemical process for obtaining selenium in high purities from alloys of selenium and tellurium. There also continues to be a need for improved processes for obtaining selenium and other photoconductive elements in high purity, which processes involve a minimum number of process steps, do not require high temperature distillations, and wherein most of the reactants selected for the process can be recycled and reused. Furthermore, there continues to be a need for improved processes for reclaiming and obtaining selenium, in high purity, which processes eliminate pollution hazards associated with some of the prior art processes. More specifically, there continues to be a need for improved processes for obtaining in high purity, selenium, and other photoconductive elements from scrap or virgin alloys containing these elements as well as from scrap or halogen doped alloys. Furthermore, in accordance with the improved processes of the present invention, selenium, can be recovered from scrap or virgin alloys of selenium and arsenic or halogen doped materials containing selenium and arsenic as well as other contaminants.

Also, while numerous processes are known for the preparation and purification of selenium, there continues to be a need for improved processes for reclaiming this material, which process can be accomplished at low temperatures, and wherein there results products of high purity. Additionally, there continues to be a need for improved processes for reclaiming selenium, in high yields from scrap source alloys containing these materials, and other contaminants. Further, there is a need for improved processes for reclaiming photoconductive substances including selenium, by subjecting to a reduction reaction a solution containing selenium oxides. Moreover, there continues to be a need for improved processes for reclaiming photoconductive selenium substances from scrap alloys or virgin alloys containing these substances and halogens, such as chlorine, wherein the halogens are eliminated during the process.

OBJECTS OF THE INVENTION

It is an object of the present invention to provide processes for reclaiming photoconductive substances, from source materials, which overcome the above-noted disadvantages.

In another object of the present invention there is provided an improved process for obtaining selenium, from source materials, including scrap alloys containing this substance, and other contaminants.

A further object of the present invention is the provision of improved processes for separating selenium alloys containing these elements, and other contaminants.

In yet another object of the present invention there is provided improved processes for separating in any proportion, selenium from alloys containing these elements and other impurities.

In a further object of the present invention there is provided improved processes for reclaiming selenium, from scrap alloys, or virgin compositions containing this element.

In an additional object of the present invention there is provided improved processes for obtaining selenium, from scrap alloys or virgin compositions containing this element in combination with halogen materials such as chlorine.

In yet a further object of the present invention there is provided improved processes for reclaiming selenium from scrap alloys or virgin compositions containing this element and other contaminants.

In an additional object of the present invention there is provided improved processes for reclaiming selenium from scrap alloys or virgin materials containing selenium, and halogen substances such as chlorine.

In still yet a further object of the present invention there is provided improved processes for recovering photoconductive elements including selenium, from source materials containing this element, and other contaminants by the direct reduction of a solution containing selenium oxides.

These and other objects of the present invention are accomplished by the provision of an improved process for obtaining in high purity photoconductive compositions, including selenium, which comprises providing a source material, converting the source material into a solution mixture of the corresponding oxides, and subsequently adding a reducing composition thereto. More specifically, the present invention is directed to an improved process for reclaiming or recovering selenium, in high purity, 99.999 percent, which comprises providing a source material, such as a scrap alloy containing this element and other substances, converting this material into a mixture of the corresponding oxides of the elements, separating the resulting selenium oxides by selective alcoholic dissolution, followed by subjecting the solution mixture of selenium oxides to a reduction reaction, and thereafter separating the selenium product from the solution.

In one specific illustrative embodiment the process of the present invention comprises converting a scrap alloy containing selenium, to a mixture of corresponding oxides, followed by treating the mixture with an alcohol for the primary purpose of dissolving the selenium oxide formed. Subsequently, the resulting solution is treated with a reducing substance wherein the selenium precipitated product is obtained in solution.

DESCRIPTION OF PREFERRED EMBODIMENTS

The following specific preferred embodiments of the process of the present invention will now be provided, however, it is not desired to be limited to the process parameters disclosed since other reaction conditions including temperatures, reaction times, and amounts of reactants; sources of materials to be treated, and the like, can be selected providing the objectives of the present invention are achieved.

Initially a source material, such as a scrap alloy available subsequent to the coating of aluminum drums for electrostatographic imaging members, containing selenium, tellurium, arsenic, chlorine and other impurities, are treated with a strong acid. In one specific embodiment, nitric acid is added to the scrap alloy with extensive stirring and slight warming to an appropriate temperature, for example, at a temperature not exceeding 65° C., for sufficient period of time so as to cause complete dissolving of the scrap alloy. Generally, complete dissolution occurs in about 2 hours to about 3 hours, however, lesser or greater times may be necessary depending, for example, on the composition of the scrap alloy, the temperature selected, and the amount of nitric acid used. Generally, about 800 millileters to about 1,500 milliliters of nitric acid are used for each one pound of scrap alloy being dissolved. Thereafter, the excess nitric acid is removed by distillation, collected and optionally recycled for later use in the process. During this treatment of the scrap alloy, the chlorine contained therein is removed as hydrogen chloride, and/or chlorine gas.

For accomplishing dissolution of the scrap alloys, nitric acid, sulphuric acid, and mixtures thereof can be employed. When mixtures are used, there is contained therein generally from about 80 percent by weight of nitric acid and 20 percent by weight of sulphuric acid, although lesser and greater prcentages of mixtures may be selected.

As a result of this treatment there is formed a solution mixture of oxides of selenium, tellurium, and arsenic. This solution is then treated with an aliphatic alcohol, filtered, and thereafter the resulting solution filtrate is subjected to a reduction reaction. There results in the solution the selenium product, in high purity, which is seperated therefrom by filtration and identified by optical emission spectroscopy. In U.S. Pat. No. 4,411,698, the disclosure of which is totally incorporated herein by reference, several specific reaction parameters applicable to the process of the present invention are described.

Generally, the alcohol selected is of the formula ROH, wherein R is an alkyl group containing from 1 to about 30 carbon atoms, and preferably from 1 to about 6 carbon atoms. Illustrative examples of preferred alcohols include those wherein the R group is methyl, ethyl, propyl, butyl, pentyl, hexyl, and the like, with methyl, and ethyl being preferred. Specific illustrative examples of alcohols selected for the process of the present invention include methanol, ethanol, and propanol.

The amount of alcohol used in the treatment process is dependent on a number of factors, including the reaction conditions, the composition of the scrap alloy, and the like, generally, however, there is used for each pound of scrap source material, from about 500 milliliters to about 850 milliliters, and preferably from about 600 milliliters to about 700 milliliters of alcohol.

The solution is subjected to a reduction reaction as described, for example, in U.S. Pat. No. 4,411,698, the disclosure of which is totally incorporated herein by reference. In one embodiment thus, a chemical reducing agent, such as hydrazine is added to the solution at a suitable temperature, for example, at a temperature of from about 20 degrees Centigrade, to about 100 degrees Centigrade resulting in the formation of high purity selenium.

Numerous different reducing agents can be selected for accomplishing the reduction of the selenium oxide solution. Illustrative examples of chemical reducing agents include hydrazine, sulfur dioxide, hydroxylamine, hydroquinone, thioureas, phosphites, formic acid, ascorbic acid, glyoxal and the like. The preferred chemical reducing agents are hydrazine, and sulfur dioxide.

Reducing agents, such as hydrazine are generally added to the solution in an amount sufficient so as to cause a complete precipitation of selenium in high purity and in high yields, greater than 85 percent, and in some instances greater than 98 percent. The reduction reaction is generally completed when no further nitrogen is emitted from the reaction mixture.

With regard to reducing agents such as sulfur dioxide, they can generally be bubbled through the solution for a period of time sufficient to cause complete formation of a black, or red precipitate. Generally, this occurs within a period of time not exceeding about one to two hours, at a temperature of from about 75 degrees centigrade to about 90 degrees centigrade, with respect to the formation of black selenium, although periods of time and temperatures outside these ranges may be utilized.

Upon completion of the reduction reaction there results a selenium precipitate of a certain color, the specific color produced being dependent on, for example, the reducing agent selected, and the reaction temperature. Thus when hydrazine is the reducing agent, a black precipitate of crystalline selenium results, while when sulfur dioxide is selected as the reducing agent, a red precipitate of amorphous selenium is produced initially, which is converted to a black color with heat. The desired high purity selenium can then be separated from the reaction mixture by a number of suitable known methods including filtration. Subsequently, as an optional treatment step, the separated selenium can be washed with suitable solvents such as water and cellosolve, followed by allowing the selenium to dry in air. Normally about 500 milliliters or more of washing solvent is selected for each pound of precipitated selenium.

The purity of the selenium, 99.999 percent, obtained in accordance with the process of the present invention, was determined by optical emission spectroscopy.

Various different source materials can be selected for treatment in accordance with the process of the present invention in addition to the scrap alloys of selenium, tellurium and arsenic mentioned hereinbefore. Examples of such source materials include photoconductive flexible belts, resulting from the coating operation for the manufacturing of such belts, scrap or virgin alloys of selenium tellurium, selenium arsenic, selenium arsenic and halogen, selenium tellurium and halogen, selenium antimony, selenium antimony tellurium, and the like.

Other source materials containing for example, selenium in combination with other elements can be treated in accordance with the process of the present invention. Examples of these elements in addition to those specifically disclosed hereinbefore, include, for example, titanium, gallium, germanium, rhodium, palladium, indium, cadmium, thallium, silver, aluminum, arsenic, boron, barium, bismuth, calcium, cobolt, chromium, copper, iron, mercury, sodium, magnesium, nickel, lead, antimony, tin, silicon, zinc, and the like.

The high purity substances obtained in accordance with the process of the present invention, including the high purity selenium, can be selected for use as photoconductive imaging members in electrostatographic imaging systems. Thus, for example, selenium of a 99.999 percent purity obtained in accordance with the process of the present invention can be combined with high purity arsenic, or high purity tellurium, for selection as a photoconductive imaging member. These alloys generally contain a substantial amount of selenium, about 60 percent or more, thus alloys comprised of from about 60 percent to about 95 percent by weight of selenium, and from about 5 percent to about 40 percent by weight of tellurium are envisioned. Additionally, alloys containing from about 95 percent to about 99.9 percent of selenium and from about 5 percent to about 0.5 percent by weight of arsenic, can be used. Generally, however, numerous various alloys of any proportions can be selected as the photoconductive member, wherein the elements of the alloy are purified in accordance with the process of the present invention. Examples of other alloys include selenium antimony, selenium cadmium, and the like. Examples of layered organic photoresponsive devices containing the high purity selenium prepared in accordance with the process of the present invention include those devices comprised of generating and transport layers as described in U.S. Pat. No. 4,265,990, the disclosure of which is totally incorporated herein by reference. As examples of generating layers for such devices there is selected trigonal selenium, while examples of the transport layer disclosed in this patent include various diamines dispersed in an active resinous binder mixture.

There is illustrated in FIG. 1 a flow diagram of an embodiment of the process of the present invention wherein a scrap alloy containing selenium, tellurium, arsenic and chlorine is dissolved in nitric acid, followed by the removal of the hydrogen chloride formed, and removal of the excess nitric acid. As a result of this treatment, there results a mixture of the oxides of selenium, tellurium and arsenic. This mixture is then treated with an alcohol, ROH, resulting in the formation of a solution and a precipitate. The solution is then treated with a reducing agent, and the selenium product formed is separated therefrom by filteration.

The following examples specifically defining preferred embodiments of the present invention are now provided, which examples are not intended to limit the scope of the present invention, it being noted that various alternative parameters which are not specifically mentioned are included within the scope of the present invention. Parts and percentages are by weight unless otherwise indicated. In the examples, the identity and purity of the isolated esters was determined by infrared, mass spectroscopy, ultraviolet analysis and elemental analysis, while the purity of the reclaimed products was determined by Optical emission spectroscopy. Differential-Pulse Polarography was selected for determining the chlorine content.

EXAMPLE I

This example illustrates the conversion of a selenium tellurium alloy containing 25 percent by weight tellurium, into a mixture of their respective oxides.

There was charged into a 150 milliliter round bottom (RB) flask equipped with a reflux condenser, 100 milliliters of concentrated nitric acid. There was then added to the flask 16 grams of a selenium tellurium alloy, containing 25 percent by weight of tellurium, followed by stirring the contents of the flask with a magnetic stirrer, and heating at 70° C. until a clear solution was obtained. Nitric acid was then removed by distillation at 100°–112° C., and any remaining traces of nitric acid were removed under high vacuum. The white residue that resulted was a mixture of selenium dioxides, and tellurium dioxides.

The mixtures of oxides collected was then separated in accordance with the procedure as outlined in Example II.

EXAMPLE II

The mixture of oxides obtained in accordance with the process of Example I was charged to a 500 milliliter RB flask equipped with a reflux condenser, and refluxed with 150 milliliters of absolute ethanol for 30 minutes, during which time a slurry, slightly grey in color, was obtained. After cooling this slurry to room temperature, it was filtered. The precipitate, of tellurium oxides, as determined by spectroscopic and analytical methods, was collected, washed with 50 milliliters (2×25 ml.) of absolute ethanol, and dried. The filtrate which was a solution of selenium oxides in ethanol was also collected.

EXAMPLE III

There was charged into a 2-liter 3-necked round bottom flask, equipped with a reflux condensor, a stirrer, and an addition funnel, the selenium oxide solution as prepared in Example II, followed by the dropwise addition of 3 milliliters of hydrazine. Subsequent to vigrous stirring for three minutes there resulted a blackslurry, which was cooled to room temperature, and filtered. Thereafter the black powder obtained was washed with 100 milliliters, (4×25 milliter) of ethanol, dried, and weighed. Selenium, 11.8 grams in a purity of 99.999 percent was obtained.

EXAMPLE IV

This example describes the conversion of a scrap alloy containing selenium, tellurium, arsenic, and chlorine, to a mixture of oxides of selenium, tellurium, and arsenic.

There was added in small portions over a period of 30 minutes, to a 2 liter round bottom (RB) flask containing 1,500 milliliters of concentrated nitric acid, 453 grams of a scrap alloy containing selenium, over 95 percent by weight, tellurium, arsenic, and chlorine, about 500 ppm. The reaction was exothermic as evidenced by the evolving of nitrogen gas during the addition of the alloy to the flask. Upon completion of the addition, the contents of the flask were warmed to about 50° C., with stirring, until a clear solution results. Nitric acid was then distilled off at 100°–112° C. and any traces of nitric acid were removed under high vacuum. The remaining white residue was a mixture of oxides of selenium, tellurium and arsenic.

EXAMPLE V

In this Example, selenium oxides prepared in accordance with Example IV are separated from the mixture of oxides in accordance with the following process.

The mixture of oxides obtained in accordance with the process of Example IV was boiled with 800 milliliters of absolute ethanol for 30 minutes. The resulting gray slurry was cooled to room temperature and filtered. The precipitate, which was a mixture of oxides of tellurium and arsenic was collected, washed with 100 milliliters (4×25 ml.) of ethanol and dried. The filtrate, which was a solution of selenium oxide and selenous acid in ethanol, was also collected.

EXAMPLE VI

This example describes the conversion of the solution of oxides of selenium, prepared in accordance with Example V into selenium.

The solution of selenium oxides as prepared in Example V was charged into a 3 liter Erlenmeyer flask. Thereafter 1,000 milliliters of deionized water was added to the flask, and sulfur dioxide was vigorously bubbled for 2 hours through the reaction mixture, while maintaining the temperature between 80 to 90 degrees centigrade. The resulting precipitate was then separated from the mixture by filtration followed by washing with 2,000 milliliters of hot water, 4-500 milliliter portions. A black shiney selenium product, 432 grams was collected, and subjected to optical emission spectroscopy, which indicated the absence of arsenic and tellurium carryover. Differential pulse polarographic analysis indicated the absence of chlorine carryover in the reclaimed selenium. The selenium had a purity of 99.999 percent.

EXAMPLE VII

This example is directed to the reclamation of high purity selenium from a scrap alloy containing selenium, arsenic and chlorine.

A scrap alloy, 100 grams, containing selenium, and arsenic, 0.1 to 5 percent, and chlorine about 5 to 500 parts per million, was converted to a mixture of the oxides of selenium, and arsenic in accordance with the process of Example IV. The resulting selenium oxide was then separated from the oxides of arsenic by treating the mixture with 200 milliliters of absolute ethanol, followed by filtration, in accordance with the procedure of Example IV. The precipitate of arsenic oxides was discarded.

Thereafter the selenium oxides in absolute ethanol was then reduced with sulfur dioxide in accordance with the procedure of Example V. There was obtained 96 grams of high purity, 99.999 percent selenium. Differential pulse polargraphic analysis indicated an absence of chlorine.

The high purity selenium prepared in accordance with the process of Examples VI, and VII was then formulated into an imaging member by vacuum depositing such selenium as is, without any high temperature distillations, on an aluminum substrate, the selenium being present in a thickness of about 50-60 microns. The aluminum substrate was of a thickness of about 2,000 to 3,000 microns.

Subsequently, the selenium member is charged positively and subjected to imagewise exposure. The resulting latent electrostatic image is then developed with a toner composition comprised of a styrene/n-butylmethacrylate copolymer (58/42), 90 percent by weight and 10 percent by weight of carbon black. Excellent quality images, with desirable resolution, and acceptable solid areas resulted after 100 imaging cycles, as compared to images of lower resolution after 100 imaging cycles when commercially available selenium was used as the imaging member.

Other modifications of the present invention will occur to those skilled in the art based upon a reading of the disclosure of the present application, and these modifications are intended to be included within the scope of the present invention.

I claim:

1. A process for the reclamation of selenium from scrap alloys which comprises converting the alloy into a mixture of oxides, separating the selenium oxide formed by alcoholic dissolution, followed by treating the resulting solution with a reducing agent selected from the group consisting of hydrazine, sulfur dioxide, hydroxylamine, hydroquinone, thioureas, phosphites, formic acid, ascorbic acid, and glyoxal; and thereafter separating the selenium product therefrom.

2. A process for the reclamation of selenium in a purity of 99.999 percent consisting essentially of providing a scrap alloy containing selenium, converting the alloy into a mixture of the corresponding oxides, reacting the oxides with an alcohol, separating from the mixture a solution of selenium oxides, treating the resulting selenium oxide solution with a reducing agent selected from the group consisting of hydrazine, sulfur dioxide, hydroxylamine, hydroquinone, thioureas, phosphites, formic acid, ascorbic acid, and glyoxal; and thereafter separating the selenium product therefrom.

3. A process in accordance with claim 1 wherein the reducing agent is hydrazine or sulfur dioxide.

4. A process in accordance with claim 1 wherein the reduction reaction is accomplished at a temperature ranging from about 25 degrees Centigrade to about 100 degrees Centigrade.

5. A process in accordance with claim 1 wherein the alcohol is methanol or ethanol.

6. A process in accordance with claim 2 wherein the reducing agent is hydrazine or sulfur dioxide.

7. A process in accordance with claim 2 wherein the reduction reaction is accomplished at a temperature ranging from about 25 degrees Centigrade to about 100 degrees Centigrade.

8. A process in accordance with claim 2 wherein the alcohol is methanol or ethanol.

* * * * *